(12) United States Patent
Liu

(10) Patent No.: US 11,279,438 B2
(45) Date of Patent: Mar. 22, 2022

(54) FOLDING FRAME STRUCTURE FOR TRAILER

(71) Applicant: Cheh-Kang Liu, Taipei (TW)

(72) Inventor: Cheh-Kang Liu, Taipei (TW)

( * ) Notice: Subject to any disclaimer, the term of this patent is extended or adjusted under 35 U.S.C. 154(b) by 357 days.

(21) Appl. No.: 16/381,180

(22) Filed: Apr. 11, 2019

(65) Prior Publication Data

US 2020/0324853 A1    Oct. 15, 2020

(51) Int. Cl.
*B62K 27/02* (2006.01)
*B62K 27/00* (2006.01)
*B62K 27/12* (2006.01)

(52) U.S. Cl.
CPC ............ *B62K 27/02* (2013.01); *B62K 27/003* (2013.01); *B62K 27/12* (2013.01)

(58) Field of Classification Search
CPC .... B62K 15/00; B62K 27/02; B62K 27/0003; B62K 27/12
USPC ....................................................... 280/204
See application file for complete search history.

(56) References Cited

U.S. PATENT DOCUMENTS

| 6,705,628 | B2 * | 3/2004 | Kahmann | B62B 7/06 280/204 |
| 7,341,265 | B1 * | 3/2008 | Liu | B62K 27/003 280/204 |
| 2007/0284842 | A1 * | 12/2007 | O'Donnell | B62K 27/003 280/204 |

* cited by examiner

*Primary Examiner* — Minnah L Seoh
*Assistant Examiner* — Felicia L. Brittman
(74) *Attorney, Agent, or Firm* — Demian K. Jackson; Jackson IPG PLLC

(57) ABSTRACT

A foldable frame structure for trailer so designed that the distance between the pivot connection center of each pivot holder and the left/right side frame and the topmost edge of the left/right frame bar of the bottom frame is greater than the distance obtained by deducting the width of the collapsed bottom frame from the height from the left/right frame bar of the bottom frame to the topmost edge of the left/right side frame. Thus, the left side frame and the right side frame can be individually collapsed and closely attached to the bottom frame in one step. The present invention can greatly save the transportation volume and simplify the folding structure and folding action, and thus achieve the purpose of user's convenient collection and carrying.

1 Claim, 9 Drawing Sheets

FOLDING FRAME STRUCTURE FOR TRAILER

BACKGROUND OF THE INVENTION

1. Field of the Invention

The present invention relates to trailer technology and more particularly, to a foldable frame structure for trailer, which greatly saves the transportation volume, simplifies the folding structure and folding action and facilitates storage and carrying.

2. Description of the Related Art

U.S. Pat. No. 7,341,265 discloses a frame structure for foldable baby trailer, which includes a bottom frame formed of two side bars and a front bar and a rear bar, two vertical side frames each having two bottom frame bars respectively pivoted to the side bars and an arched top frame bar pivoted to the bottom frame bars, a transverse top bar detachably connected to the arched top frame bars of the two vertical side frames, a trailer bar pivoted to the front side of the side bar of the bottom frame and selectively locked between an extended position and a received position, and a bumper detachably connected between the side bars of the bottom frame. According to this design, the left and right vertical side frames must be respectively folded up so that they can be collapsed and attached to the bottom frame. This collapsing operation is still not convenient.

SUMMARY OF THE INVENTION

The present invention has been accomplished under the circumstances in view. It is therefore the main object of the present invention to provide a foldable frame structure for trailer, which greatly saves the transportation volume and simplifies the folding structure and folding action.

It is another object of the present invention to provide a foldable frame structure for trailer, which facilitates storage and carrying.

DETAILED DESCRIPTION OF THE INVENTION

Figure 1:
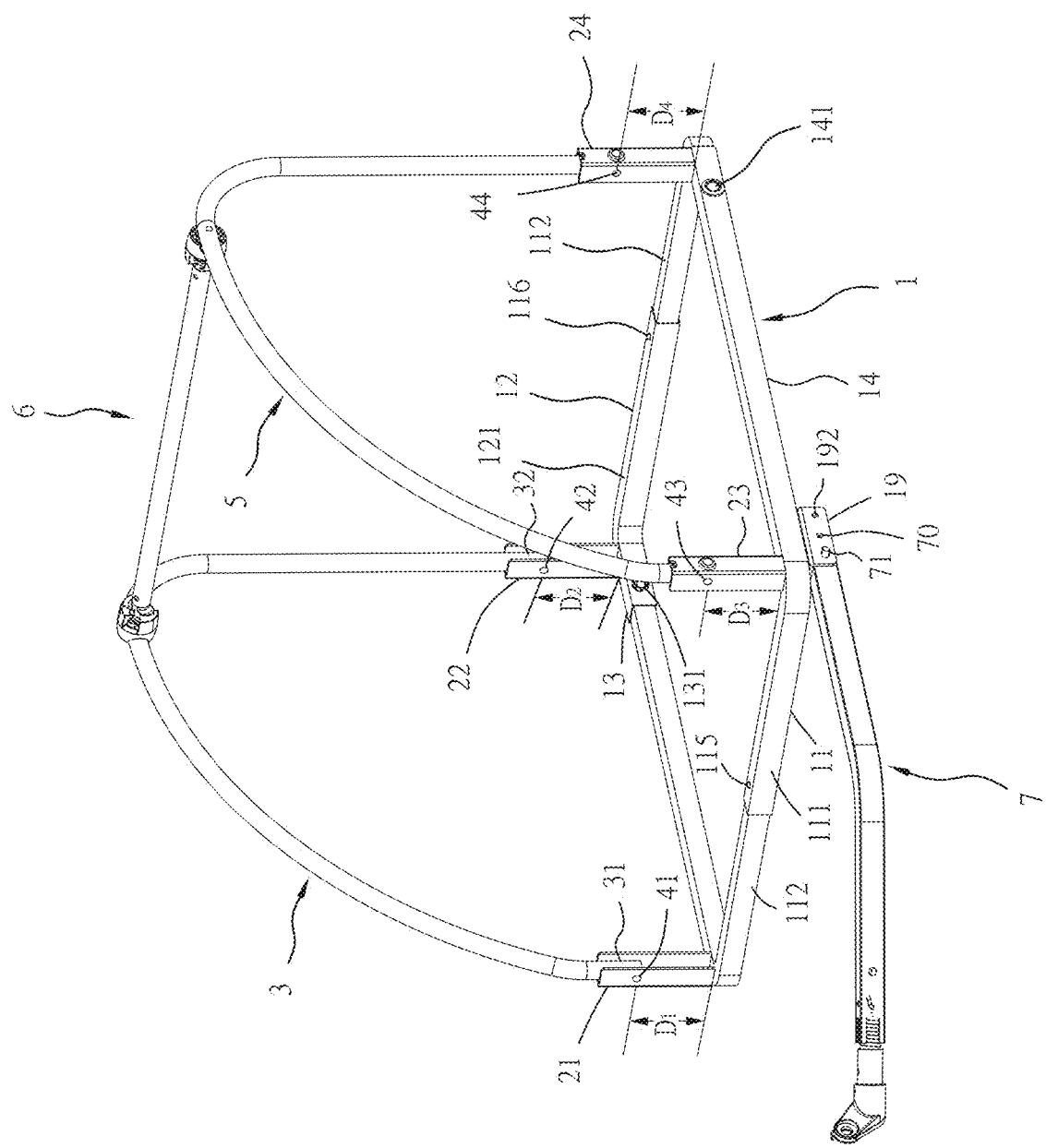
FIG. 1 is an elevational view of a foldable frame structure for trailer in accordance with a first embodiment of the present invention.

Referring to FIGS. 1-7, a foldable frame structure for trailer in accordance with the present invention is shown. The foldable frame structure for trailer comprises a bottom frame 1, a left side frame 3, a right side frame 5, an upper crossbar 6, and a drag bar 7.

The bottom frame 1 comprises a front frame bar 11 comprising a front outer tube 111 with a first mounting hole 1111 at one end thereof (see FIG. 6), a front inner tube 112 with a second mounting hole 1121 at one end thereof (see FIG. 6) and a first fastening member 115 in the form of a pin fastened to the first mounting hole 1111 and the second mounting hole 1121 to connect the front outer tube 111 and the front inner tube 112 in a line, a rear frame bar 12 comprising a rear outer tube 121 with a third mounting hole 1211 at one end thereof (see FIG. 7), a rear inner tube 122 with a fourth mounting hole 1221 at one end thereof (see FIG. 7) and a second fastening member 116 in the form of a pin fastened to the third mounting hole 1211 and the fourth mounting hole 1221 to connect the rear outer tube 121 and the rear inner tube 122 in a line, a left frame bar 13 connected between the front frame bar 11 and the rear frame bar 12 at a left side and having a left shaft hole 131 near a rear end thereof, a right frame bar 14 connected between the front frame bar 11 and the rear frame bar 12 at an opposing right side and having a right shaft hole 141 near a rear end thereof, a left trailer wheel 17 pivotally connected to the left shaft hole 131 (see FIG. 3), a right trailer wheel 18 pivotally connected to the right shaft hole 141 (see FIG. 3), a connection block 19 fixedly mounted on a front bottom side of the right frame bar 14 remote from the right shaft hole 141 and providing a front plug hole 191 and a rear plug hole 192 (see FIG. 3), a first pivot holder 21 and a second pivot holder 22 respectively fixedly provided at the opposing front and rear ends of the left frame bar 13 and a third pivot holder 23 and a fourth pivot holder 24 respectively fixedly provided at the opposing front and rear ends of the right frame bar 14.

The left side frame 3 is a U-shaped frame bar, having opposed front and rear ends 31; 32 thereof respectively pivotally connected to the first pivot holder 21 and the second pivot holder 22 by a first pivot pin 41 and a second pivot pin 42.

The right side frame 5 is a U-shaped frame bar, having opposed front and rear ends 51; 52 thereof respectively pivotally connected to the third pivot holder 23 and the fourth pivot holder 24 by a third pivot pin 43 and a fourth pivot pin 44.

Figure 3:
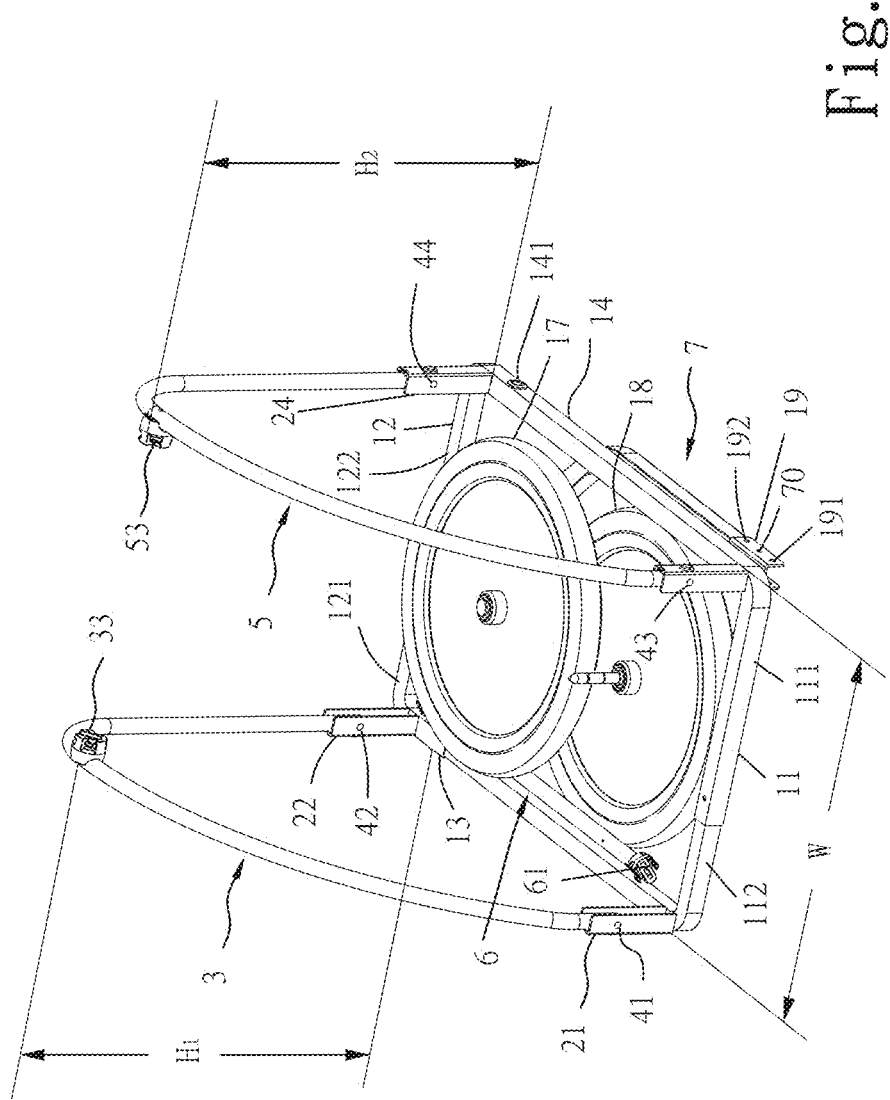
FIG. 3 is an elevational view of the present invention, illustrating the upper crossbar and the left and right trailer wheels detached, the drag bar received to the bottom side of the bottom frame and the bottom frame collapsed.
Figure 4:
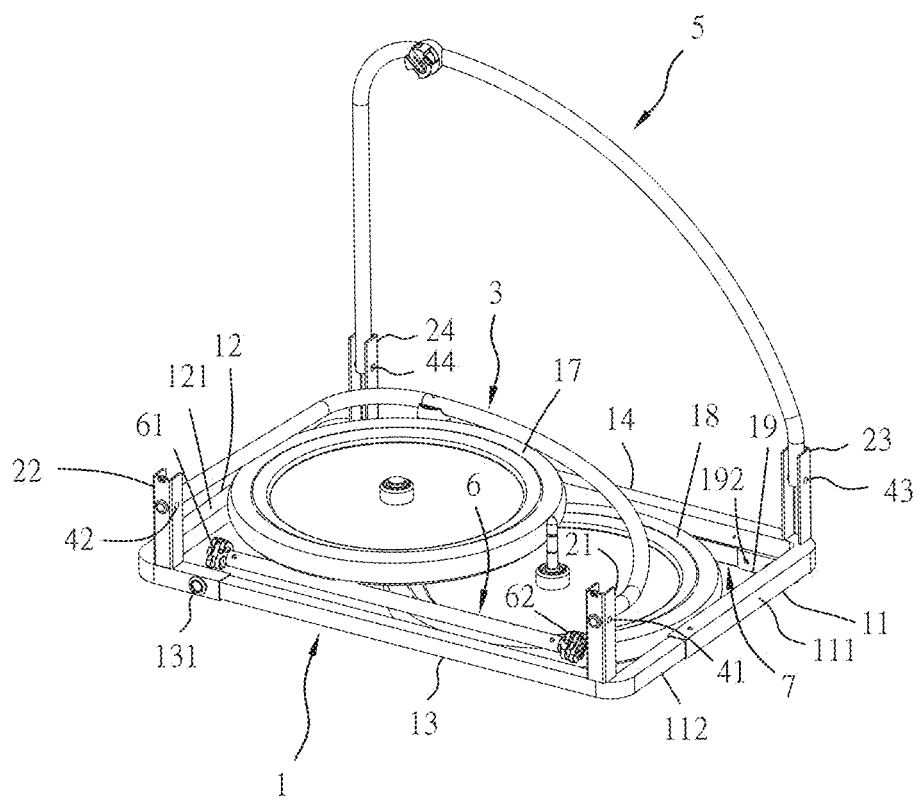
FIG. 4 corresponds to FIG. 3, showing the left side frame collapsed and received to the bottom frame.
Figure 5:
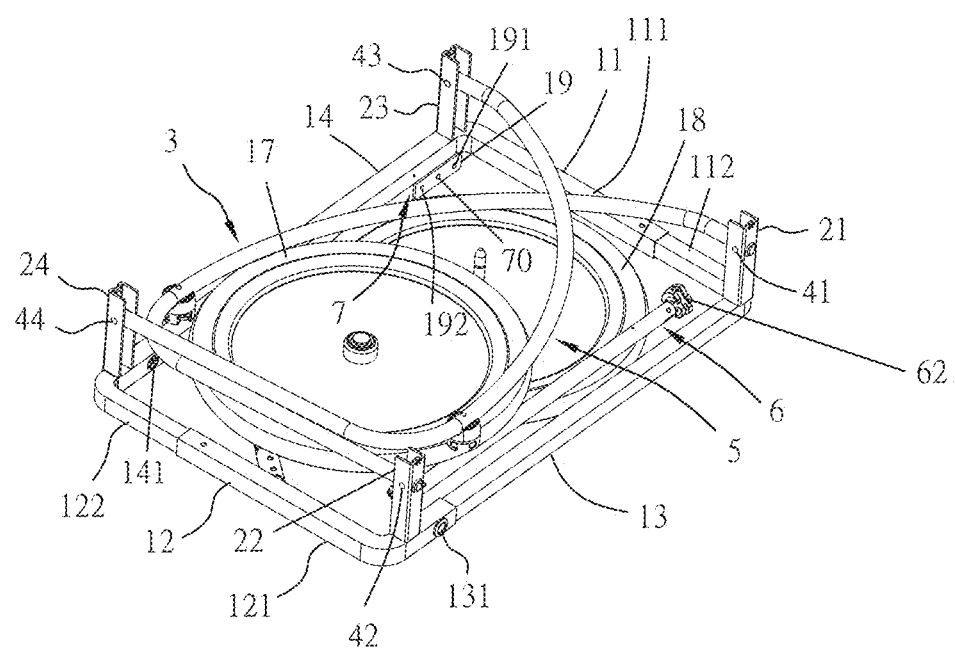
FIG. 5 corresponds to FIG. 4, showing the right side frame collapsed and received to the left side frame and the bottom frame.
Figure 6:
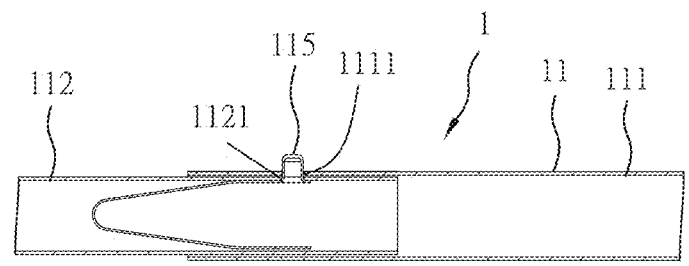
FIG. 6 is a sectional view of the front frame bar of the bottom frame.
Figure 7:
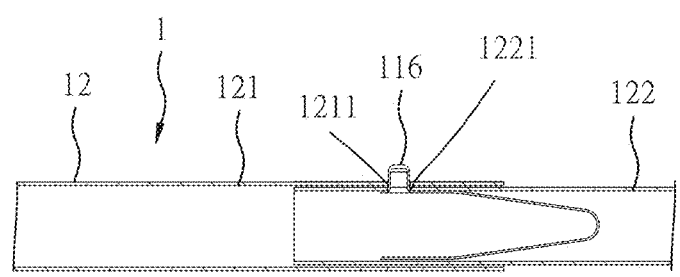
FIG. 7 is a sectional view of the rear frame bar of the bottom frame.

The upper crossbar 6 is connected between the left side frame 3 and the right side frame 5 at a top side, having a left spring hook 61 (see FIG. 4) located at a left end thereof and detachably hooked in a hook groove 33 at the left side frame 3 (see FIG. 3) and a right spring hook 62 (see FIG. 4) located at an opposing right end thereof and detachably hooked in a hook groove 53 at the right side frame 5 (see FIG. 3).

Figure 2:
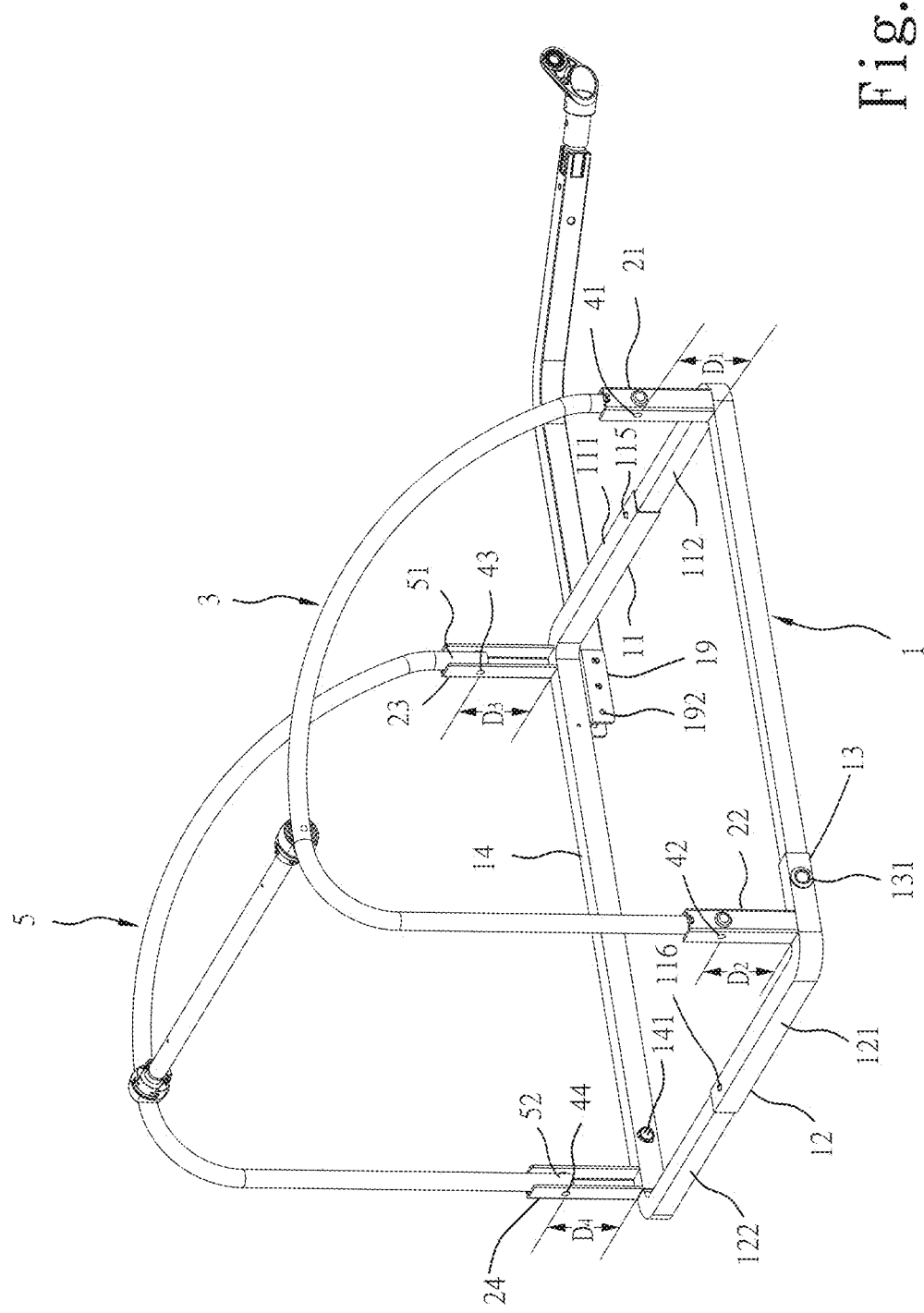
FIG. 2 corresponds to FIG. 1 when viewed from another angle.

The drag bar 7 is pivotally connected to the connection block 19 by a fifth pivot pin 70 and turnable about the pivot pin 70 to an extended operative position for connection to a bike (see FIGS. 1 and 2). When the drag bar 7 is turned to the extended operative position, a detachable lock pin 71 can be inserted into a front pin hole 191 at the connection block 19 to lock the drag bar 7 to the connection block 19.

Figure 8:
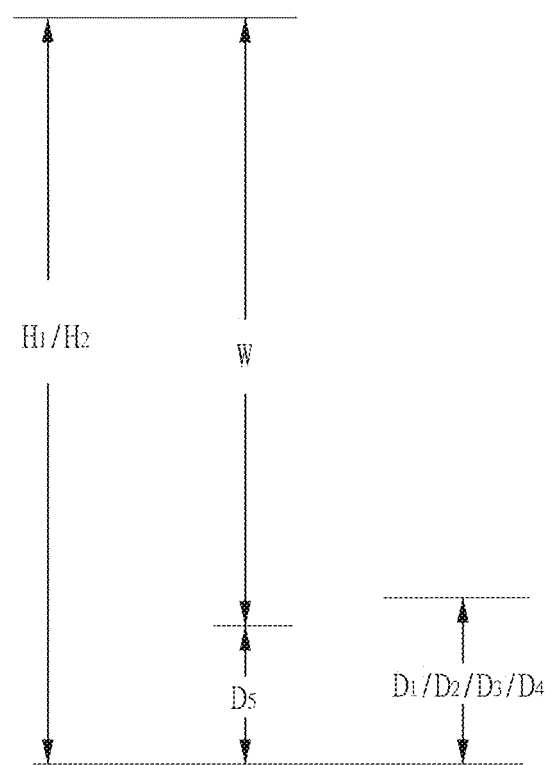
FIG. 8 is a comparison diagram of the distances D1/D2/D3/D4 between the pivot holder and the left/right side frame, the height H1/H2 from the left/right frame bars of the bottom frame to the topmost edge of the left/right side frame and the width W of the collapsed bottom frame.

The main features of the present invention are outlined hereinafter. The distance D1 between the pivot connection center of the first pivot holder 21 and the left side frame 3 (i.e., the axis of the first pivot pin 41) and the topmost edge of the left frame bar 13 of the bottom frame 1 (see FIGS. 1 and 2), the distance D2 between the pivot connection center of the second pivot holder 22 and the left side frame 3 (i.e., the axis of the second pivot pin 42) and the topmost edge of the left frame bar 13 of the bottom frame 1, the distance D3 between the pivot connection center of the third pivot holder 3 and the right side frame 5 (i.e., the axis of the third pivot pin 43) and the topmost edge of the right frame bar 14 of the bottom frame 1 and the distance D4 between the pivot connection center of the fourth pivot holder 24 and the right side frame 5 (i.e., the axis of the fourth pivot pin 44 and the topmost edge of the right frame bar 14 of the bottom frame 1 are greater than the distance D5 (see FIG. 8) obtained by deducting the width W of the collapsed bottom frame 1 from the height H1/H2 (see FIG. 3) from the left/right frame bar 13; 14 of the bottom frame 1 to the topmost edge of the left/right side frame 3; 5. In the present preferred embodiment, the distances D1/D2/D3/D4 are all 95 mm, the original width of the bottom frame 1 in the operative condition is 610 mm, the width W of the bottom frame 1 in the collapsed condition is 460 mm, the height H1/H2 from the left/right frame bar 13; 14 of the bottom frame 1 to the topmost edge of the left/right side frame 3; 5 is 550 mm; thus, D1/D2/D3/D4 95 mm>D5 90 mm (H1/H2 550 mm-W 460 mm=90 mm), so that the left side frame 3 and the right side frame 5 can be individually collapsed and closely attached to the bottom frame 1 in one step.

Thus, the present invention can greatly save the transportation volume, simplify the folding structure and folding action, and facilitate storage and carrying. When going to collapse the foldable frame structure, remove the detachable lock pin 71 from the drag bar 7, then turn the drag bar 7 inwardly to the bottom side of the bottom frame 1, and then detach the left and right trailer wheels 17; 18, then disengage the left and right spring hooks 61; 62 of the upper crossbar 6 from the hook groove 33 at the left side frame 3 and the hook groove 53 at the right side frame 5, and then unfasten the first and second fastening members 115; 116 from the first and second mounting hole 1111; 1121 and receive the front inner tube 112 in the front outer tube 111 and the rear inner tube 122 in the rear outer tube 121 to collapse the bottom frame 1 so that the width W of the collapsed bottom frame 1 is obtained (see FIG. 3), and then place the left and right trailer wheels 17; 18 and the upper crossbar 6 in the collapsed bottom frame 1 (see FIG. 3), and then collapse the left and right side frames 3; 5 and receive them to the bottom frame 1 (see FIGS. 4 and 5), and thus, the foldable frame structure is completely collapsed.

Figure 9:
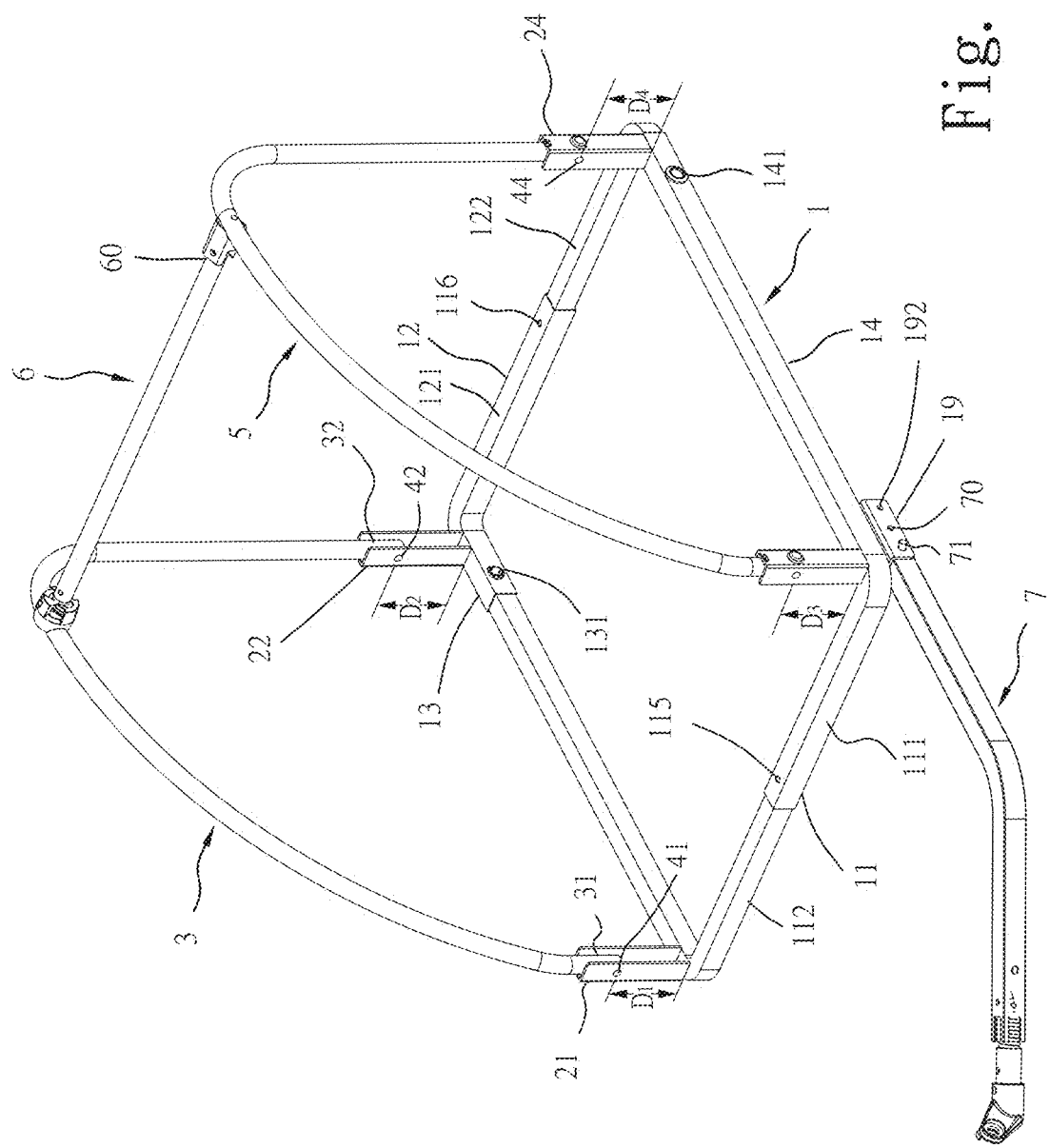
FIG. 9 is an elevational view of an alternate form of the foldable frame structure for trailer in accordance with a first embodiment of the present invention.
Figure 10:
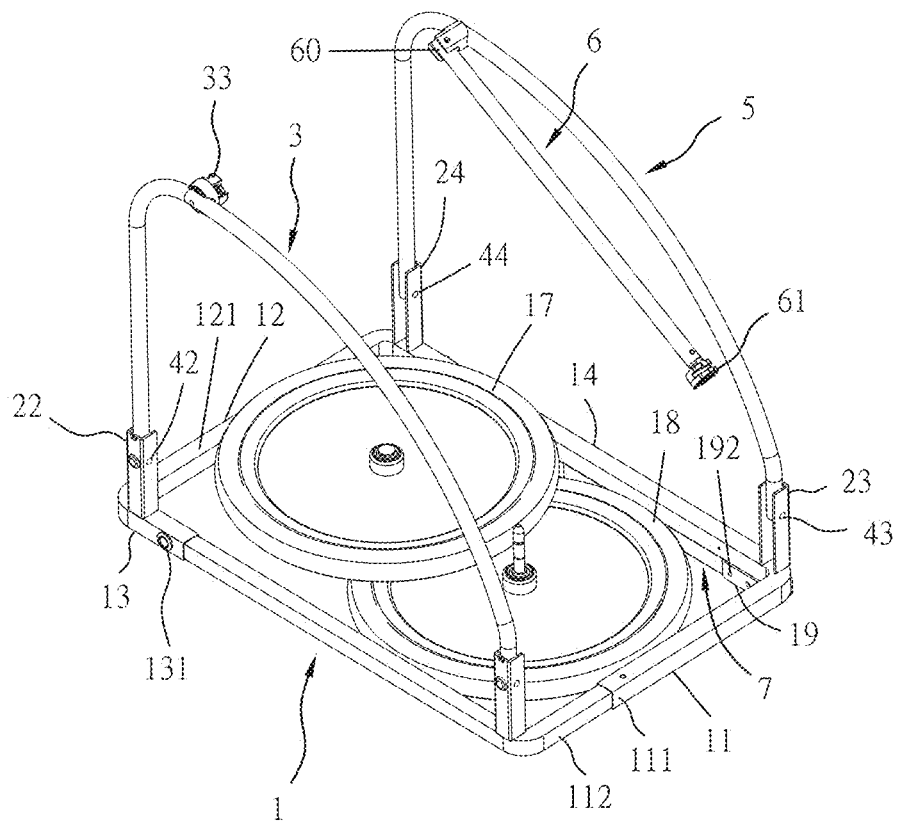
FIG. 10 illustrates the alternate form of the foldable frame structure shown in FIG. 9 partially collapsed.

FIGS. 9 and 10 illustrate an alternate form of the foldable frame structure for trailer in accordance with the present invention. In this alternate form, the upper crossbar 6 is directly pivotally connected to the left side frame 3 or right side frame 5. As illustrated in FIGS. 9 and 10, he crossbar 6 has the right end 60 thereof (see FIG. 10) pivotally connected to the top side of the right side frame 5, and the opposing left end thereof provided with a left spring hook 61 for hooking in a hook groove 33 at the left side frame 3. When you want to collapse the foldable frame structure, disengage the left spring hook 61 from the hook groove 3 at the left side frame 3, and then receive the upper crossbar 6 to the right side frame 5 (see FIG. 10), and then carry out the subsequent folding operation. In the embodiment shown in FIGS. 1-8, the opposing left and right ends of the upper crossbar 6 are respectively detachably connectable to the left and right side frames 3; 5. In the embodiment shown in FIGS. 9 and 10, the upper crossbar 6 has one end pivotally connected to the left side frame 3 or right side frame 5 and the opposite end detachably connectable to the right side frame 5 or left side frame 3.

In conclusion, the invention provides a foldable frame structure for trailer, which greatly saves the transportation volume, simplifies the folding structure and folding action and facilitates storage and carrying.

What is claimed is:

1. A foldable frame structure for trailers comprising:

a bottom frame comprising a front frame bar, said front frame bar comprising a front outer tube with a first mounting hole at one end thereof, a front inner tube with a second mounting hole at one end thereof and a first fastening member fastened to said first mounting hole and said second mounting hole to connect said front outer tube and said front inner tube in a line, a rear frame bar, said rear frame bar comprising a rear outer tube with a third mounting hole at one end thereof, a rear inner tube with a fourth mounting hole at one end thereof and a second fastening member fastened to said third mounting hole and said fourth mounting hole to connect said rear outer tube and said rear inner tube in a line, a left frame bar connected between said front frame bar and said rear frame bar at a left side and having a left shaft hole near a rear end thereof, a right frame bar connected between said front frame bar and said rear frame bar at an opposing right side and having a right shaft hole near a rear end thereof, a left trailer wheel pivotally connected to said left shaft hole, a right trailer wheel pivotally connected to said right shaft hole, a connection block fixedly mounted on a front bottom side of said right frame bar remote from said right shaft hole and providing a front plug hole and a rear plug hole, a first pivot holder and a second pivot holder respectively fixedly provided at opposing front and rear ends of said left frame bar and a third pivot holder and a fourth pivot holder respectively fixedly provided at opposing front and rear ends of said right frame bar;

a left side frame in the form of a U-shaped frame bar, said left side frame having opposing front and rear ends thereof respectively pivotally connected to said first pivot holder and said second pivot holder by a first pivot pin and a second pivot pin and having no pivoting joint intermediate the first and second pivot pins;

a right side frame in the form of a U-shaped frame bar, said right side frame having opposing front and rear ends thereof respectively pivotally connected to said third pivot holder and said fourth pivot holder by a third pivot pin and a fourth pivot pin and having no pivoting joint intermediate the third and fourth pivot pins;

an upper crossbar connected between said left side frame and said right side frame at a top side, said upper crossbar comprising a left spring hook located at a left end thereof and detachably hooked in a hook groove at said left side frame and a right spring hook located at an opposing right end thereof and detachably hooked in a hook groove at said right side frame;

a drag bar pivotally connected to said connection block by a fifth pivot pin and turnable about said pivot pin to an extended operative position for connection to a bike; and a detachable lock pin insertable into a front pin hole at said connection block to lock said drag bar to said connection block in said extended operative position; wherein: the distance between the axis of said first pivot pin and the topmost edge of said left frame bar of said bottom frame, the distance between the axis of said second pivot pin and the topmost edge of said left frame bar of said bottom frame, the distance between the axis of said third pivot pin and the topmost edge of said right frame bar of said bottom frame and the distance between the axis of said fourth pivot pin and the topmost edge of said right frame bar of said bottom frame are greater than the distance obtained by deducting the width of the collapsed said bottom frame from the height from said left/right frame bar of said bottom frame to the topmost edge of said left/right side frame.

* * * * *